Patented May 11, 1948

2,441,241

UNITED STATES PATENT OFFICE 2,441,241

VINYL RESINS PLASTICIZED WITH HEXITAN TETRA-ESTERS

Rudolph M. Goepp, Jr., New Castle, Del., assignor to Atlas Powder Company, Wilmington, Del., a corporation of Delaware No Drawing. Application March 12, 1945, Serial No. 582,421

9 Claims. (Cl. 260—36)

The present invention relates to improvements in plastic compositions.

An object of the invention is to provide new and useful plastic compositions of resins of the class of polyvinyl chloride, vinyl chloride-vinyl acetate copolymer, and polyvinyl butyral.

Other objects will become apparent in the course of the following description.

The present invention is based on the discovery that polyvinyl chloride, vinyl chloride-vinyl acetate copolymer and polyvinyl butyral resins can be plasticized to yield useful compositions by incorporating with said resins a hexitan tetra-ester of which the acyl radicals are selected from the group of acyl radicals of saturated, straight chain aliphatic acids with from 2 to 8 carbon atoms, there being not over 2 acetyl groups in the ester and the total number of carbon atoms in the four acyl groups being at least 12. These hexitan tetra-esters are characterized by high compatability with the resins, low volatility, good resistance to hydrolysis, and by their property of imparting to the resin compositions containing them a valuable set of plastic properties including high extensibility and high tensile strength.

Hexitans are tetrahydric six carbon atom cyclic inner ethers. They are obtained, in practise, by chemically removing one mol of water from a hexitol, and, as a result, the hexitans are named by reference to the respective hexitols from which they are, or can be, formed by changing the suffix -itol to -itan. The isomeric mono-anhydrides of mannitol are, therefore, called mannitans, those of sorbitol are called sorbitans, etc. Certain of the hexitans are found in nature, for example, styracitol and polygalitol. The hexitan esters of the class employed in making the compositions of this invention can be made either from hexitans directly, or from hexitols in which case the esterification is performed under conditions causing anhydridization of the hexitol to a hexitan (or hexitan mixture) concurrently with the esterification. The latter process is preferred for the production of plasticizers because of the ready availability of hexitols and the fact that the reaction produces a desirable mixture of isomers and related products, including hexide diesters, which mixture is more efficient as a plasticizer than a single chemical individual.

The hexitan can be any of the numerous possible isomers. The acids can be of any of the saturated, straight chain aliphatic acids with from 2 to 8 carbon atoms, namely, acetic, propionic, butyric, valeric, caproic, n-heptoic or caprylic. The ester can be made from one or more of the acids, certain of the mixed esters being especially suitable for some compositions. Instead of the free acids, the acid chlorides can be used where preformed hexitans are to be esterified and a low temperature reaction in a basic reaction medium is employed in such cases. Acid anhydrides can also be used to esterify preformed hexitans. Starting with a hexitol, it is preferred to use the free acid and to conduct the esterification at elevated temperature, for example at and desirably in the presence of an alkaline or strongly acid esterification catalyst. Removal of water of reaction and water liberated in the anhydridization of the hexitol can be facilitated by employing an inert liquid like toluene which forms a constant boiling mixture with the water and distilling off the mixture during the reaction, in the usual manner.

Examples of the preparation of typical hexitan tetra-esters follow:

EXAMPLE 1

*Mannitan tetrapropionate*

1456 grams mannitol, 2839 grams propionic acid, 600 ml. toluene and 4 ml. concentrated sulfuric acid were heated together to reaction temperature with mechanical stirring. Water was removed as a constant boiling mixture with the toluene in the customary manner, the mixture being condensed and separated and the toluene returned to the reactor. The reaction was continued until no more water was evolved.

The reaction mixture was washed with sodium carbonate solution to remove excess acid and then washed with water. The toluene was removed by distillation under vacuum. The product consisted principally of mannitan tetrapropionate.

The corresponding sorbitan ester can be made by substituting sorbitol for mannitol in the foregoing example.

EXAMPLE 2

*Mannitan dicaproate dipropionate*

Mannitan dicaproate was first prepared by reacting 364 grams mannitol and 500 grams caproic acid in the presence of 0.25 ml. concentrated sulfuric acid as catalyst and 200 ml. toluene to assist in water removal. The mixture was heated to reaction temperature and stirred mechanically. Water evolved in the reaction was removed as a constant boiling mixture with the toluene in the customary manner, the mixture being condensed and separated and the toluene returned to the reactor. The reaction was continued until the theoretical quantity of water (108 grams) had been evolved.

The product was recovered by washing with a solution of sodium carbonate to remove free acid. Then washing with water and finally removing the toluene by vacuum distillation.

200 grams of the mannitan dicaproate were reacted with 100 grams propionic acid in the presence of 1 ml. concentrated sulfuric acid as catalyst and 100 ml. toluene to assist in water removal. The reaction was conducted, as before, by heating, agitating, and continuous water removal. Reaction was continued until no further water was evolved.

The product was recovered by successive washings with sodium carbonate and water, and removal of toluene by distillation. The product was a mixture composed largely of mannitan dicaproate dipropionate. The other ingredients being chiefly the mannide esters of the reactant acids.

Mannitan dicaproate dipropionate may also be prepared by elimination of the first recovery step and adding propionic acid directly to the first stage product. The ester can also be made by simultaneous reaction of both acids, or by first forming the dipropionate and later reacting with caproic acid.

The other esters of the class named can be prepared by analogous processes.

To prepare the plastic compositions, the vinyl resin selected is mixed with the hexitan tetraester by the usual methods, as by milling the ingredients together or by combining them by means of a mutual solvent. Typical examples of plastic compositions were prepared as follows:

Example A

A stock solution was prepared of polyvinyl chloride 5 parts by weight in 95 parts of mesityl oxide. Tests were made by dissolving 0.83 part of the ester to be tested in 50 parts of the stock solution. The resulting solution was then cast on a glass plate by means of a doctor blade adjusted so that the film had a wet thickness of 0.03 inch. The plate and film were dried at 25° C. overnight and were then dried at 110° C. for one hour. Following this drying, the films, now composed of polyvinyl chloride plus 33⅓% of the ester, were stripped off the plate and cut into strips ½ inch wide. Films containing 50% plasticizer were made by using 1.25 parts of the ester in the resin solution instead of the standard 0.83 part. Tensile strength and elongation measurements were then made on the plasticized strips. The results of these measurements are reported below in the table. Except as otherwise indicated, the films tested contained 33⅓% plasticizer.

Table A

| Plasticizer | Tensile Strength, lbs./inch² | Per cent Elongation | Per cent Compatible |
|---|---|---|---|
| Sorbitan tetrapropionate | 5,000 | 255 | 100 |
| Sorbitan tetrabutyrate | 2,800 | 135 | 75 |
| Mannitan tetrabutyrate | 2,600 | 200 | 100 |
| Mannitan dibutyrate-diacetate (50% plasticizer) | 2,800 | 210 | 100 |
| Sorbitan dibutyrate-diacetate | 4,200 | 200 | 100 |
| Sorbitan tributyrate-propionate | 3,000 | 160 | 100 |
| Sorbitan tetracaproate | 2,500 | 255 | 75 |
| Sorbitan dicaproate-dipropionate | 3,900 | 135 | 100 |
| Mannitan tetracaproate | 2,400 | 145 | 100 |
| Mannitan tricaproate-propionate (50% plasticizer) | 3,400 | 280 | 100 |
| Mannitan diacproate-dipropionate | 2,400 | 240 | 100 |
| Sorbitan dicaprylate dipropionate | 2,900 | 185 | 100 |

Example B

A stock solution was prepared of vinyl chloride-vinyl acetate copolymer 18.8 parts by weight in 48.3 parts cyclohexanone and 32.9 parts toluene. Tests were made by dissolving 3.13 parts of the ester to be tested in 50 parts of the stock solution. Films were cast, dried and cut into strips as in Example A. Tensile strength and elongation measurements were made on the plasticized strips which were composed of the vinyl chloride-vinyl acetate copolymer plus 33⅓% plasticizer. Other plasticizer concentrations were obtained by dissolving appropriate quantities of the esters in the resin solution. To give 50% plasticizer concentration, 4.7 parts of ester were used; 60% requires the use of 5.64 parts ester, and 100% requires 9.4 parts of ester. The results of these tests are reported below in the table. Except as otherwise indicated, the films tested contained 33⅓% plasticizer.

Table B

| Plasticizer | Tensile Strength, lbs./inch² | Per cent Elongation | Per cent Compatible |
|---|---|---|---|
| Sorbitan tetrapropionate | 3,100 | 270 | 100 |
| Same at 60% plasticizer | 3,100 | 425 | 100 |
| Mannitan tetrapropionate | 2,600 | 230 | 100 |
| Same at 100% plasticizer | 460 | 575 | 100 |
| Sorbitan tetrabutyrate | 2,600 | 265 | 100 |
| Mannitan tetrabutyrate | 3,200 | 200 | 100 |
| Mannitan dibutyrate-diacetate (50% plasticizer) | 3,000 | 310 | 100 |
| Sorbitan tributyrate-propionate | 3,100 | 350 | 100 |
| Sorbitan tetracaproate | 2,700 | 295 | 100 |
| Sorbitan dicaproate-dipropionate | 3,000 | 280 | 100 |
| Mannitan tetracaproate (50% plasticizer) | 2,000 | 265 | 100 |
| Mannitan tricaproate-propionate | 2,900 | 310 | 100 |
| Mannitan dicaproate-dipropionate | 3,100 | 320 | 100 |
| Sorbitan tetracaprylate | 4,100 | 190 | 100 |
| Sorbitan tricaprylate-propionate | 3,000 | 335 | 100 |
| Sorbitan dicaprylate-dipropionate | 2,700 | 290 | 100 |
| Sorbitan caprylate-tripropionate | 2,900 | 210 | 100 |

Example C

A stock solution was prepared by dissolving 15 parts by weight of polyvinyl butyral in 85 parts of denatured ethanol (formula #30). Tests were made by dissolving 2.5 parts by weight of the ester to be tested in 50 parts of the stock solution. Films were prepared and tested as in Example A. These films contained 33⅓% plasticizer based on the polyvinyl butyral. The films containing 50% plasticizer were made by dissolving 3.75 parts of the ester in the resin solution and that with 60% plasticizer was made by dissolving 4.5 parts of the ester in the resin solution respectively in place of the 2.5 parts used for the 33⅓% films. The results of the tests are included in the table which follows. Except as otherwise indicated the films tested contained 33⅓% plasticizer.

Table C

| Plasticizer | Tensile Strength, lbs./inch² | Per cent Elongation | Per cent Compatible |
|---|---|---|---|
| Sorbitan tetrapropionate | 5,100 | 305 | 100 |
| Sorbitan tetrabutyrate | 3,800 | 290 | 100 |
| Mannitan tetrabutyrate | 4,600 | 240 | 100 |
| Mannitan dibutyrate diacetate (50% plasticizer) | 5,000 | 295 | 100 |
| Sorbitan dibutyrate-diacetate | 5,200 | 360 | 100 |
| Sorbitan tributyrate-propionate | 4,700 | 320 | 100 |
| Sorbitan tetracaproate | 4,100 | 290 | 50 |
| Sorbitan dicaproate-dipropionate | 4,300 | 290 | 50 |
| Mannitan tetracaproate (50% plasticizer) | 5,900 | 360 | 100 |
| Mannitan tricaproate-propionate (50% plasticizer) | 4,200 | 350 | 100 |
| Mannitan dicaproate-dipropionate | 4,200 | 310 | 100 |
| Mannitan caproate-tripropionate (60% plasticizer) | 4,800 | 345 | 100 |
| Sorbitan tetracaprylate | 5,700 | 345 | 75 |
| Sorbitan tricaprylate-propionate | 4,400 | 335 | 50 |
| Sorbitan dicaprylate-dipropionate | 5,200 | 345 | 75 |
| Sorbitan caprylate-tripropionate | 4,000 | 200 | 100 |

The plastic compositions above described are compatible on hot milling, for example at 120° C. and, therefore, can be compounded by this method, or preformed plastic compositions can be milled with other ingredients as pigments and the like. The plastic compositions can be used in the usual way to prepare coating compositions, sheets, shaped forms, insulating coverings for wires, etc.

The amount of plasticizer used in making a particular composition will depend largely on the requirements of softeners, extensibility, flexibility, etc., for the end use of the plastic. The plasticizers are compatible over a wide range of proportions thus making possible the formulation of a great number of compositions with one or another of the plastic properties accentuated.

The esters described above in the examples are mixed products produced in a simultaneous anhydridization-esterification reaction between the hexitol and the fatty acid or acids. They comprise the indicated ester together with other anhydro-hexitol esters of the fatty acid or acids used. Ester products of this type are preferred, as previously explained, because they are more efficient plasticizers than pure single esters and are furthermore more economical to prepare.

It is within the scope of the invention also to employ the esters of the type defined in combination with plasticizers of the conventional types, or to use a mixture of two or more of the esters herein described, as plasticizers for one of the described resins.

What is claimed is:

1. A plastic composition comprising a resin selected from the group consisting of polyvinyl chloride, vinyl chloride-vinyl acetate copolymer, and polyvinyl butyral, and as a plasticizer therefor a hexitan tetra-ester of which the acyl radicals are all selected from the group consisting of acyl radicals of the saturated straight-chain aliphatic acids with from 2 to 8 carbon atoms, there being not over 2 acetyl groups in the ester and the total number of carbon atoms in the four acyl groups being at least 12.

2. A plastic composition comprising a polyvinyl chloride resin and as a plasticizer therefor a hexitan tetra-ester of which the acyl radicals are all selected from the group consisting of acyl radicals of the saturated straight-chain aliphatic acids with from 2 to 8 carbon atoms, there being not over 2 acetyl groups in the ester and the total number of carbon atoms in the four acyl groups being at least 12.

3. A plastic composition comprising a vinyl chloride-vinyl acetate copolymer resin and as a plasticizer therefor a hexitan tetra-ester of which the acyl radicals are all selected from the group consisting of acyl radicals of the saturated straight-chain aliphatic acids with from 2 to 8 carbon atoms, there being not over 2 acetyl groups in the ester and the total number of carbon atoms in the four acyl groups being at least 12.

4. A plastic composition comprising a polyvinyl butyral resin and as a plasticizer therefor a hexitan tetra-ester of which the acyl radicals are all selected from the group consisting of acyl radicals of the saturated straight-chain aliphatic acids with from 2 to 8 carbon atoms, there being not over 2 acetyl groups in the ester and the total number of carbon atoms in the four acyl groups being at least 12.

5. A plastic composition comprising a resin selected from the group consisting of polyvinyl chloride, vinyl chloride-vinyl acetate copolymer, and polyvinyl butyral, and as a plasticizer therefor a sorbitan tetra-ester of which the acyl radicals are all selected from the group consisting of acyl radicals of the saturated straight-chain aliphatic acids with from 2 to 8 carbon atoms, there being not over 2 acetyl groups in the ester and total number of carbon atoms in the four acyl groups being at least 12.

6. A plastic composition comprising a polyvinyl chloride resin and as a plasticizer therefor a hexitan dibutyrate-diacetate.

7. A plastic composition comprising a polyvinyl chloride resin and as a plasticizer therefor sorbitan dibutyrate diacetate.

8. A plastic composition comprising a vinyl chloride-vinyl acetate copolymer resin and as a plasticizer therefor a hexitan tributyrate propionate.

9. A plastic composition comprising a vinyl chloride-vinyl acetate copolymer resin and as a plasticizer therefor sorbitan tributyrate propionate.

RUDOLPH M. GOEPP, Jr.